Patented Mar. 22, 1949

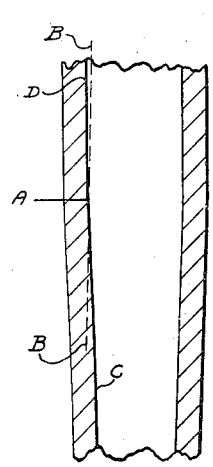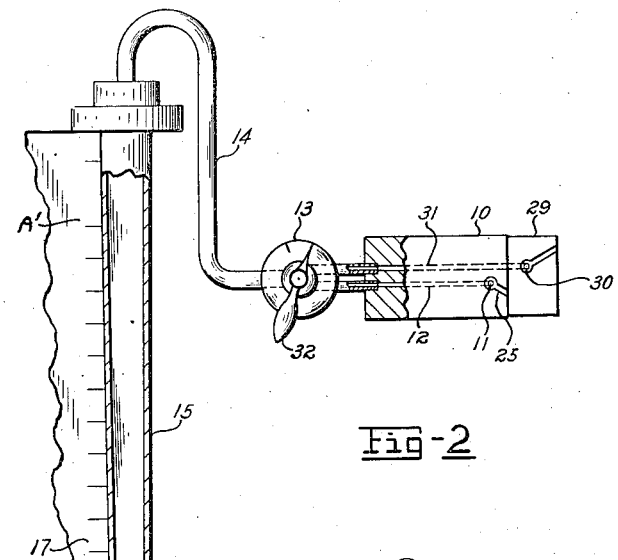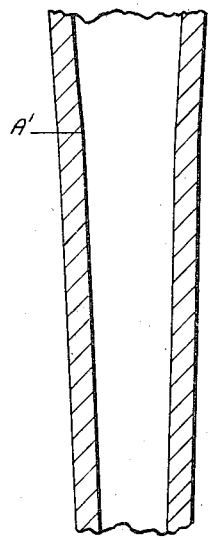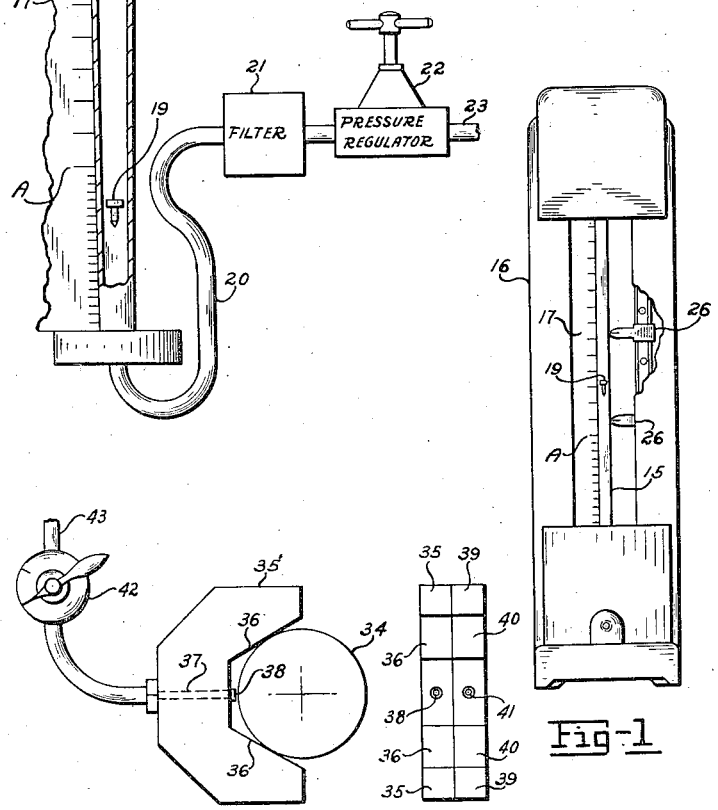

2,465,035

UNITED STATES PATENT OFFICE 2,465,035

GAUGING DEVICE

Louis F. Polk and Raymond Mahlmeister, Dayton, Ohio, assignors to The Sheffield Corporation, Dayton, Ohio, a corporation of Ohio Application July 16, 1945, Serial No. 605,338

1 Claim. (Cl. 73—37.5)

This invention relates to gauging devices, and more particularly to gauging devices in which a small leakage flow of air or other fluid takes place at the part being checked.

One object of the invention is the provision of a gauging device having a flow measuring tube connected to a leakage orifice that provides a leakage path the effective size of which is determined by the workpiece, the tube having a gradually varying internal cross sectional area with different portions of the tube having different degrees of taper so the sensitivity of the instrument will be different at different portions along the length of the tube.

Other objects and advantages of the invention will be apparent from the following description, the appended claim and the accompanying drawing in which:

Fig. 1 is a front elevation of a gauging instrument embodying the present invention;

Fig. 2 is a diagrammatic illustration showing the connections to the flow tube;

Fig. 3 is an enlarged sectional view of a portion of the flow tube where the rate of taper changes;

Fig. 4 is an enlarged sectional view of another portion of a flow tube;

Fig. 5 is a detail view showing the work engaging element that may be used for measuring outside diameters; and Fig. 6 is an end view of the element shown in Fig. 5.

Referring more particularly to the drawing, in which like parts are designated by the same reference numerals, the gauging device as herein illustrated in Figs. 1 to 3 is for measuring the size of a hole by comparison of the leakage or rate of air flow at the workpiece. In such a construction, the hole in the workpiece may be engaged by a spindle 10 having a gauging orifice 11 in communication with a passage 12 which leads through a valve 13 to a conduit 14. The conduit 14 is in free communication with the upper end of an upright transparent flow tube 15 which is mounted in a suitable support 16 at the side of a graduated scale 17. The internal cross sectional area of the tube 15 varies gradually, the end having a smaller cross sectional area being at the bottom. Within the tube is a light float 19 having a diameter very slightly smaller than the inside tube diameter at the lower end of the tube. As the float is carried upwardly by air flow through the tube, the amount of air flow that can take place past the sides of the float increases, so that the height of the float gives an indication of the rate of flow of fluid through the tube.

The lower end of the tube is connected through a conduit 20 to a filter 21. The filter is connected to a pressure regulating valve 22 which has a supply connection 23 by means of which it can be attached to the factory air line or to any other suitable fluid pressure source.

The pressure regulating valve is adjustable to give a desired air pressure supply, at a constant pressure, to the lower end of the flow tube 15. The filter removes any condensation or moisture present on the low pressure side of the pressure regulating valve, and the filter, the flow tube, and the various connections to the orifice 11 are without any substantial restriction so that free movement of the air can take place from the pressure regulator to the gauging orifice. As a flow of air from the constant pressure supply takes place through the tube, the float is raised by the air flow until it assumes a stationary position. As the clearance between the float and the tube is small, and the weight of the float is small, a comparatively small amount of air flow is sufficient to move the float upwardly from the bottom of the tube.

The diameter of the spindle 10 may be a few ten thousandths of an inch less than the inside diameter of the hole to be checked and the cylindrical surface of the gauging nozzle 11 is preferably a few ten-thousandths of an inch below the surface of the spindle 10. When the spindle is applid to a hole of the proper or exact size, a standard part for example, a leakage path is provided the effective size of which is determined by the workpiece, so that the indications produced by the float will measure the size of the hole. Air flow through the gauging orifice will be exhausted through a channel 25 in the surface of the spindle.

In the course of manufacture of a part with a hole of a predetermined size within the allowable tolerance limits, as by a grinding or lapping operation, the hole is gradually increased in size until the predetermined size is obtained. At the point where the predetermined size is reached, it is desired to have a high sensitivity of the instrument, or in other words, have the instrument so arranged that a small incremental increase in the rate of flow produces a rather wide movement of the float. When the hole is considerably undersize and the part can be entered by the gauging spindle 10, it is desirable that the float should be raised above the bottom of the flow tube, but the amount of change in the float level for any incremental increase under these conditions is not so important. The gradual taper of the tube, in accordance with the present invention, therefore undergoes a change at some point along the length of the tube so that the total range that can be measured by the float is greatly increased although the sensitivity of the tube throughout a predetermined portion of its length is kept very high. As shown in Fig. 2, at the point A, above where the float happens to be illustrated, the taper of the internal area of the tube changes. Below the point A, the inside of the tube has a taper which is preferably conical and which is greater than the degree of taper above the point A. This is shown in Fig. 3, in which the line B is parallel to the tube axis, the line C being inclined to the line B at an angle which is a little greater than the angularity of line D with respect to line B. The actual taper is really only a few thousandths or a few hundreths of an inch in the whole length of the tube, the degree of taper being exaggerated considerably in Fig. 3.

Since the degree of taper is greater below the point A, the response of the float to changes in the rate of air flow when the float is operating in the lower portion of the tube will not be as great as when the float is in the zone above the point A. That is, under conditions of very small air flow through the tube, corresponding to conditions when the hole in the part is considerably undersize, the movement of the float is reduced but as the size of the workpiece approaches the desired undersize tolerance limit, the float approaches the level A. When the size of the workpiece is within tolerance, the float is operating above the level A in the range where the tube is of reduced taper and consequently the graduations on the scale adjacent the middle portions of the tube are much more widely spaced apart than the graduations along the lower portions of the scale, although the distance between adjacent graduations may represent the same change in size of the workpiece. The upper and lower tolerance limits may be shown by adjustable arms 26 that can be set at the proper height on the base 16 by successively engaging the spindle in holes of the exact size of these tolerance limits and setting the arms 26 accordingly. Then when the spindle is applied to the workpiece, if the size of the workpiece corresponds exactly to the desired size, the float will be half way between the arms 26. If the size of the workpiece is not exactly correct but still within the allowable tolerance limits, the float will be positioned somewhere along the middle portion of the tube between the two arms 26.

The taper of the tube above the point A may be uniform up to the top of the tube, although it is preferred to have the taper increased considerably from some point near the top of the tube up to the top. Thus, from the point A' to the top of the tube, as shown in Figs. 2 and 4, the taper above this point A' may be quite rapid, and either of a conical form or a suitable curvature. The zone between the point A and A' is the zone in which the float would be located when the work is approximately the correct size desired or when the work is only very slightly larger or smaller than the required tolerance limits. However, above this point A', the air would more and more rapidly by-pass the float so that the float would not be blown up to the top of the tube, at least not as rapidly as would otherwise be the case, when the gauging spindle is removed from the work and an increase in the rate of flow takes place through the flow tube. The effect is a great reduction in the impact that the float would make against a suitable spring or other abutment or stop arranged at the top of the tube. And when the spindle is engaged with the work even though the rate of flow of air from the gauging nozzle is comparatively rapid, the float would be arranged slightly below the top of the tube even though there was considerable distance between the gauging nozzle and the work.

The spindle diameter must be only slightly less than the desired size of the hole in the workpiece, otherwise an excessive amount of air flow would take place between the gauging nozzle 11 and the wall of the workpiece. Consequently the gauging nozzle can only enter the workpiece when the hole is quite close to the desired size. In a grinding operation, however, where very high accuracy is required, and where comparatively small changes in the rate of air flow through the flow tube would give rather wide movements of the float, it is desired to provide an extension 29 on the spindle, the outside diameter of this extension being very slightly less than the outside diameter of the body portion of the spindle. This extension can therefore enter the workpiece when the hole in the workpiece is still much smaller than the desired size. This extension 29 is provided with a gauging orifice 30, or with a pair of opposed gauging orifices, communicating with a passage 31 which leads to the valve 13. The valve can be operated by its handle 32 to connect the conduit 14 with either the passage 12 of the gauging orifice 11, or the passage 31 of the gauging orifice 30. When the valve is adjusted to connect the gauging orifice 30 to the flow tube, the float level shows first at the lower portion of the tube below the point A in the region where the instrument is not as sensitive. Then as the work is gradually reduced and the size of the hole is increased, with the extension 29 in the hole, the float rises until it reaches a predetermined point along the tube near the top of the tube. This shows the operator the size of the workpiece is approaching the desired size but is still undersize. The size of the hole, however, is now large enough to permit the body portion 10 of the spindle to enter. The operator then moves the valve handle 32 to disconnect the orifice 30 and places the orifice 11 in communication with the flow tube. As the amount of clearance between the gauging orifice 11 and the workpiece is very small at this time, the float will take some position near the bottom of the tube between the bottom and the point A. As the lapping or finishing operation continues, and the size of the hole is gradually increased, the float 19 will rise higher and higher until it is in the range of permissible tolerances.

In gauging a solid part, such as a cylinder 34 shown in Fig. 5, the work engaging member 35 takes the form of a block having inclined locating surfaces 36 which contact the workpiece, and having a passage 37 which leads to a gauging nozzle 38. When the workpiece is of an exact size desired, there may be a few ten thousandths of an inch between the gauging nozzle 38 and the surface of the workpiece. If the workpiece is larger, however, this spacing will be larger between the nozzle and the workpiece, and more flow will take place through the gauging instrument. The gauging instrument used with the member 35 will be like that illustrated in Fig. 2 except that the tube throughout the lower and central portions of the tube may be uniform. Thus, the tube used in conjunction with the work engaging member 35 will be as shown in Fig. 4, the point A' showing where the taper changes. The taper, in Fig. 4, is exaggerated of course. The upper portion of the tube above the point A' has a greater degree of taper than the lower portion and, if desired, the taper may be made still greater at the very top portion above point A'. The lower portion of the tube below the point A' is preferably considerably longer than the upper portion. When the work is oversize and a large air flow takes place, the float will be near the top of the tube, but since the taper is greater at the upper portion of the tube the float may still be visible below the top of the tube even though there is considerable space between the gauging nozzle and the work. As the size of the work is reduced, as by grinding or lapping, and approaches the desired dimension or tolerance range, the float moves downwardly and approaches the point A'. As a further decrease in diameter takes place, the float moves downwardly in the range below the point A' where the sensitivity of the instrument is much greater so that a very accurate indication is obtained when the work is of the correct size. The arrangement thus provides a comparatively large range while having extreme sensitivity in the region of permissible tolerances.

The work engaging member 35 may, if desired, have a lateral extension 39 provided with work locating faces 40 and having a gauging nozzle 41, the two gauging nozzles 38 and 41 being connected with individual supply passages of a two-way valve 42 which connects through a conduit 43 to the lower end of the flow tube illustrated in Fig. 4. The extension 39 with its work locating faces 40 and gauging nozzle 41 are adapted to accommodate workpieces of slightly larger diameter than the faces 36 and gauging nozzle 38 of the member or block 35. In other words, the gauging nozzle 41 is slightly spaced from an oversize workpiece about the same distance as exists between the gauging nozzle 38 and the workpiece of the desired size. When the gauging nozzle 41 is connected through the valve 42, and the workpiece is oversize, the float will be operating in the upper portion of the tube, where the taper is greatest, and as the workpiece is reduced in size, the float will descend and by the time it is substantially at the bottom of the tube, the workpiece is small enough so that the float will register in the upper portion and below the top of the tube in the region of increased taper, with the gauging nozzle 38 connected to the flow tube and the workpiece held by the work locating surfaces 36 with same spaced a little greater than normal from the nozzle 38. The operator by connecting and utilizing the nozzle 41 and the extension portion of the work engaging member can thus determine the size of the workpiece even before the workpiece is small enough in diameter to permit the use of the gauging nozzle 38.

While the forms of apparatus herein described constitute preferred embodiments of the invention, it is to be understood that the invention is not limited to these forms of apparatus, and that changes may be made therein without departing from the scope of the invention as defined in the appended claim.

What is claimed is:

Gauging apparatus for comparing the size of a workpiece with a standard, comprising a cylindrical work engaging plug member having a gauging nozzle for cooperation with a portion of the work surface to provide a leakage path the effective size of which is determined by the workpiece, means for supplying fluid under controlled pressure, means for measuring flow to said nozzle, said work engaging member having a cylindrical extension provided with a second gauging nozzle which is closer to the work axis than the first mentioned nozzle, and means for selectively connecting either of said gauging nozzles to said flow measuring means.

LOUIS F. POLK.
RAYMOND MAHLMEISTER.

REFERENCES CITED

The following references are of record in the file of this patent:

UNITED STATES PATENTS

| Number | Name | Date |
| --- | --- | --- |
| 1,965,333 | Connell | July 3, 1934 |
| 1,982,528 | Mennesson | Nov. 27, 1934 |
| 2,139,282 | Poock et al. | Dec. 6, 1938 |
| 2,254,259 | Aller | Sept. 2, 1941 |
| 2,346,406 | Wright | Apr. 11, 1944 |

FOREIGN PATENTS

| Number | Country | Date |
| --- | --- | --- |
| 136,689 | Great Britain | Dec. 24, 1919 |